United States Patent [19]

Gandon et al.

[11] 4,016,055

[45] Apr. 5, 1977

[54] METHOD OF EXTRACTING CONSTITUENT METAL VALUES FROM POLYMETALLIC NODULES FROM THE SEA

[75] Inventors: Louis Gandon, Rambouillet; Roger Jean, Maurepas; Serge Solar, Dampierre, all of France

[73] Assignee: Societe Metallurgique Le Nickel SLN, Paris, France

[22] Filed: July 10, 1975

[21] Appl. No.: 594,814

[30] Foreign Application Priority Data

July 10, 1974 France .................. 49.24016

[52] U.S. Cl. .................. 204/106; 204/113; 75/109; 75/112; 423/40; 423/150
[51] Int. Cl.² .................. C25C 1/12; C25C 1/06
[58] Field of Search .................. 423/40, 139, 150; 75/109, 117, 119, 80, 72, 74, 101 R, 101 BE, 112, 82; 204/113, 107

[56] References Cited

UNITED STATES PATENTS 1,360,666  11/1920  Mills .................. 75/109
3,880,651  4/1975  Queneau et al. .................. 423/40

FOREIGN PATENTS OR APPLICATIONS 871,066  5/1971  Canada .................. 75/80

OTHER PUBLICATIONS

Queneau, *Cobalt and the Nickelferous Limonites,* Doctorol Thesis, Technical Highschool Delft 1971, pp. 39, 40, 160, 176, 179–181, 182, 184, 192, 193.
Vasilchikov et al. "Iron–Manganese Nodules from the Ocean Floor" *Isvetnye Metally* vol. 9, No. 1 pp. 46–49 (1968).

*Primary Examiner*—Oscar R. Vertiz
*Assistant Examiner*—Brian E. Hearn
*Attorney, Agent, or Firm*—Fleit & Jacobson

[57] ABSTRACT

A method of extracting constituent metal values from sea nodules containing copper, cobalt, iron and nickel is disclosed. The method involves melting the nodules under reducing conditions to obtain a concentrate containing said metals and reacting the metal concentrate in an aqueous medium with gaseous chlorine to obtain an aqueous solution containing the chlorides of said metal. Copper is thereafter precipitated from the aqueous solution and subsequently electrorefined, while the iron and cobalt are extracted from the aqueous solution by means of organic extractants and then re-extracted from the organic phases by aqueous phases.

11 Claims, No Drawings

METHOD OF EXTRACTING CONSTITUENT METAL VALUES FROM POLYMETALLIC NODULES FROM THE SEA

The invention relates to a hydrometallurgical method of processing polymetallic nodules from the sea to extract constituent metal values therefrom and more particularly to a method of obtaining metals of electrolytic purity from the nodules, and includes the metals or metal values so obtained.

It is known that polymetallic nodules, sometimes called "manganese nodules" because this metal is their main constituent, deposit at the bottom of the sea, usually at very great depths. These deposits were collected and first mentioned by a British maritime expedition in 1876. Their main characteristics are described in "The mineral resources of the sea" by J. L. Mero (Elsevier 1965) and elsewhere.

Table I hereinafter shows the average total composition of nodules from some deposits which have been studied recently, with regard to the main metals therein.

TABLE I

| Composition : weight % Origin of nodules | Mn | Fe | Ni | Co | Cu | Equivalent % nickel |
|---|---|---|---|---|---|---|
| Pacific (average from samples) | 24.2 | 14 | 0.99 | 0.35 | 0.53 | 1.64 |
| Pacific | 24.9 | 9.8 | 1.08 | 0.15 | 0.71 | 1.55 |
| Pacific (off California) | 25 | 10 | 1.0 | 0.1 | 0.5 | 1.33 |
| Pacific (La Coquille expedition) | 23.9 | 14.3 | 0.6 | 1.07 | 0.10 | 1.98 |
| Atlantic | 16.3 | 17.5 | 0.42 | 0.31 | 0.20 | 0.89 |
| Atlantic (off Florida) | 17 | 11 | 0.6 | 0.3 | 0.1 | 1.02 |
| The richest Ni/Co/Cu deposits (Samoa Archipelago) | 37 | | 2.0 | 0.2 | 2.4 | 3.21 |
| Those containing most manganese | 46.4 | | 0.2 | 0.01 | 0.03 | 0.22 |
| Lowest and highest contents | 8.2 | 2.4 | 0.16 | 0.01 | 0.03 | |
| | 50.1 | 26.6 | 2.0 | 2.3 | 1.6 | |

This table shows that there are wide differences in compositions of different deposits. For example, the manganese content in one deposit was 8.2% and yet in another deposit 50.1%, and the nickel content may also vary, from a low of 0.16% to a high of 2.0%. Nodules from the Pacific have so far been found most rich in valuable metals.

Clearly, therefore, any method of processing these deposits so as to recover the metal therefrom should be adaptable to wide ranges in composition, especially as even within a single deposit appreciable variations in composition are possible.

Metallurgical processing of polymetallic nodules has been thought not economically justified unless it led to the recovery of nickel, copper or, in extreme cases, cobalt, because the recovery of the other elements, such as of manganese which constitutes around a quarter of most nodules, is not worthwhile unless those elements can be obtained as by-products without increasing the cost of processing. This is because those elements (such as iron and manganese) occur abundantly in easily mined and treated ores on land, whereas the more valuable metals such as molybdenum and rare-earth metals occur in too low concentrations in the nodules.

Hydrometallurgical processes for treating polymetallic nodules to obtain inter alia nickel, copper, and cobalt are known and often involve lixiviation with ammonia, similar to the process applied to certain lateritic ores. Other processes involve lixiviation with hydrochloric or sulphuric acid, but they all have a number of disadvantages, mainly high capital cost. They are also complicated and consequently expensive since the nodules have a high manganese content.

An object of the invention, therefore, is to provide a hydrometallurgical process of moderate capital cost for treating marine polymetallic nodules, within a wide range of compositions, so as to recover in reasonable yield the valuable metals therein.

The invention accordingly provides a method of extracting constituent metal values from polymetallic nodules from the sea, the method comprising the following steps in succession:

a. melting the nodules under reducing conditions to obtain a concentrate containing at least nickel, copper, cobalt and a part of the iron in the nodules;

b. reacting gaseous chlorine with the metal concentrate in an aqueous medium thereby to obtain an aqueous solution containing chlorides of nickel, cobalt, copper and iron, and removing any solid matter from the aqueous solution;

c. precipitating the copper contained in the aqueous solution using a more electropositive metal powder, and preferably melting and casting the precipitate into anodes;

d. electro-refining the copper precipitate anodes (c);

e. purifying the aqueous solution and removing the cobalt and iron therefrom by contacting the aqueous solution with organic phases for liquid-liquid ion-exchange; and f. re-extracting the cobalt and iron from the organic phase by contacting the organic phase with an aqueous reextraction phase, and preferably g. electrolysing the aqueous solution resulting from the purification and removal (e) to yield nickel, and further preferably electrolysing at least one of the aqueous re-extraction phases from the re-extraction (f) so as to yield iron and/or cobalt.

Preferably, the melting under reducing conditions (a) is performed at a temperature of up to 1700° C, using a carbonaceous reducing agent in an amount of from 3 to 10% of the weight of the melt.

Advantageously, the reaction (b) using gaseous chlorine is performed at a temperature from 70° to 110° C, the amount of chlorine used being between from 0.9 to 1.1 times that stoichiometrically necessary.

The precipitation or cementation (c) of the copper can be performed using either powdered iron, or, preferably, by using a polymetallic composite obtained by crushing the product of the melting under reducting conditions (a).

Step (e), wherein a purified solution of nickel and cobalt is obtained in chloride form, is preferably performed by the method described in U.S. patent application, Ser. No. 594,812, filed July 10, 1975. entitled "A hydrometallurgical treatment process for extracting constituent metal values from ferro-nickel."

Advantageously the chlorine produced during the steps wherein metals are electrolytically produced, i.e., (d) and (f) and elsewhere, is recycled to the reaction b) using gaseous chlorine.

Furthermore, the reaction (b) can be continuously performed in a reaction column continuously supplied at its lower end with water and gaseous chlorine and at its upper end with the metal concentrate obtained during the melting (a), aqueous solution (resulting from the counter-current reaction) being continuously withdrawn, e.g., by overflowing, from an upper part of the column. It may be advantageous to recycle part of the withdrawn aqueous solution to the lower end of the column, the rest of overflow being sent to the following purification and electrolysis steps. Consequently, the reaction occurs continuously in counter-current, and the partial recycling results in excellent yields.

The invention will now be described by way of examle. For simplicity, the description has been divided into a number of sections corresponding to the main steps in the method.

A. MELTING UNDER REDUCING CONDITIONS

This has long been applied on an industrial scale. The following examples show that even polymetallic nodules from the sea can be so treated and that if the reduction conditions are suitably chosen, it is possible to obtain metallic nickel in the form of an alloy rich also in copper ("cupro-nickel").

EXAMPLE 1

5 kg of polymetallic nodules are used, having the composition given in Table II hereinafter. The nodules have a loss on ignition of 28.3% and an effective moisture content at 105° C of 14.2%.

TABLE II

| % composition by weight for treatment | |
|---|---|
| Mn | 26.7 % |
| Cu | 0.93% |
| Ni | 1.15% |
| Co | 0.18% |
| Fe | 4.10% |
| Mo | 0.05% |
| S | 0.05% |
| CaO | 1.78% |
| MgO | 2.93% |
| SiO$_2$ | 12.4 % |
| Al$_2$O$_3$ | 3.94% |
| P | 0.14% |

First, the nodules are roughly crushed to particles of size not exceeding 20 mm. A quantity of anthracite (between 3 and 7% by weight in different tests) is added to the crushed product. The mixture is dried and then heated to melting-point, after a pre-reduction stage if required at a temperature of the order 800° – 900° C. After all the product has melted, it is poured into a sand ladle, the metal concentrate being separated from the slag after cooling. Next, the metal is chemically analysed and the chemical and metallurgical yields are determined. The results are shown in Table III hereinafter.

TABLE III

| Reducing Agent | Anthracite 3% | Yield | | Anthracite 4% | Yield | | Anthracite 5% | Yield | |
|---|---|---|---|---|---|---|---|---|---|
| | % Metal obtained | Chemical | metal-lurgical | % metal obtained | chemical | metal-lurgical | % Metal obtained | chemical | metal-lurgical |
| Ni | 47.3 | ~100 % | 78% | 43.5 | ~100 % | 40 % | 19.6 | 98.9% | 97.2% |
| Cu | 35.1 | | | 33.5 | | | 13.3 | | 95 % |
| Fe | 10.2 | | | 16.4 | | | 54.7 | | |
| Mo | 0.01 | | | 0.46 | | | 0.8 | | 94 % |
| Co | 3.94 | | | 4.55 | | | 2.33 | 64 % | 60 % |
| Mn | 0.47 | | | 0.4 | | | 4.06 | | |
| Si | 0.15 | | | 0.10 | | | 0.05 | | |
| S | 0.01 | | | 0.01 | | | 1.88 | | |
| C | 0.3 | | | 0.23 | | | 0.02 | | |
| | Slag | | | Slag | | | Slag | | |
| Ni | 0.37 % (Ni°) | | | 0.91 % (0.91 % Ni°) | | | 0.05 % (0.03 % Ni°) | | |
| Cu | 0.5 % | | | 0.72 % | | | 0.08 % | | |
| Fe | 6.3 % (5.2 % Fe°) | | | 5.7 % (4.8 % Fe°) | | | 1.6 % (1.4 % Fe°) | | |
| Mo | 0.07% | | | 0.04% | | | <0.005 % | | |
| Co | 0.14% (0.14% Co°) | | | 0.22 % (0.14% CO°) | | | 0.11 % (including 0.01% Co°) | | |
| Mn | 37.3% | | | 35.4% | | | 40.8 % | | |
| SiO$_2$ | 18% | | | 16.4% | | | 19.4% | | |

As can be seen, in all cases the chemical yield of nickel by reduction was nearly 100%. The metallurgical yield was excellent for nickel, copper, cobalt and molybdenum when between 5 and 7% of anthracite (as a carbonaceous reducing agent) was used.

The best quantity of reducing agent is largely dependent on the composition of the polymetallic nodules to be processed, and can easily be determined in each particular case.

The aforementioned operations can be continuously performed in existing metallurgical installations such as are used at present for processing nickel ores.

B. REACTING WITH GASEOUS CHLORINE

This step, in other words lixiviating with chlorinated water, has been described in detail in our aforementioned British patent application.

The metal concentrate obtained from the melting step (A) is first granulated and introduced at the top of a reaction column, the bottom of which is supplied through an inlet with water and gaseous chlorine. A solution of chlorides overflows from the column and is extracted. A part is recycled to the inlet at the bottom of the column, and the rest of the solution is sent to the subsequent processing step (C).

A column of this kind has two important advantages over conventional lixiviation reactors: no mechanical stirring is necessary, thus avoiding any abrasion; and the chlorinated water flows in counter-current to the metal concentrate granules which are being processed, with the result that the chloride solution leaving the column has been in contact with an excess of granules and does not contain any ferric chloride, which has been reduced by fresher granules. In this method, the excess chlorine can also be used up.

The following example shows that this method of dissolution by chlorine, described in our above-mentioned patent application, can be advantageously applied to the reduction of polymetallic nodules, giving excellent dissolution yields.

EXAMPLE

The metal sample to be processed was obtained by melting and reduction of nodules as described hereinbefore and had the following composition:

| | |
|---|---|
| Fe | 54.7 % |
| Ni | 19.6 % |
| Cu | 13.3 % |
| Mn | 4.0 % |
| Co | 2.3 % |
| C | 1.88% |

The sample was crushed until all the particles had a size less than 500 microns.

The test was performed batchwise on 175 g of granules at a temperature of 103° C. The volume of water used was 900 ml, the reaction lasted 7 hours and chlorine was injected into the water at a flow rate of 68 g per hour, i.e., a total of 476 g, whereas the total quantity theoretically necessary, in accordance with the chemical reactions involved, was 203 g. After being dried in an oven for 4 hours, the resulting aqueous solution and solid residue were analysed. The results of the analysis are given in the following Table IV.

TABLE IV

| | Solution g/l | % Residue |
|---|---|---|
| Ni | 28.6 | 1.38 |
| Cu | 20.3 | 1.12 |
| Fe total | 85.0 | 7.75 |
| Co | 3.8 | 0.16 |
| Mn | 5.4 | 0.28 |
| Mo | 1.12 | 0.55 |
| $Fe^{--}$ | 0.056 | n.d. |
| C | n.d. | balance | n.d.: not determined

As can be seen, the total yield of dissolved metals from the starting product is 99.7% — an excellent result. In other words, nearly all the nickel, copper, cobalt and iron goes into solution in chloride form when lixiviated by chlorinated water, thus demonstrating the applicability of the substantially unmodified lixiviation process described in our aforementioned patent application to the processing of marine polymetallic nodules, which consequently can be processed with no extra capital cost by an existing installation used for example for dissolving ferro-nickel with chlorinated water.

C. CEMENTATION OF COPPER

At the end of the preceding step, a solution of chlorides is obtained, consisting mainly of nickel chloride $NiCl_2$, cupric chloride $CuCl_2$, ferrous chloride $FeCl_2$ and cobalt chloride $CoCl_2$.

Copper can easily be extracted from the solution by cementation (precipitation) by means of a more electropositive metal such as iron or nickel. As shown by the following example, precipitation can be brought about by using iron powder or alternatively by using the metal alloy obtained by melting the nodules, which can precipitate out copper after being vigorously crushed.

EXAMPLE

The precipitation tests were made in an ordinary 500 ml beaker and constant agitation at a temperature of 80° C. The precipitating powder (either powdered iron or powder obtained by finely crushing the metal alloy concentrate obtained by melting the nodules) was introduced into the beaker in small doses over a period of half an hour.

Next, the precipitate was filtered in vacuo, washed and dried at 100° C for 3 hours.

Table V hereinafter shows the operating conditions and the test results.

TABLE V

| TEST | 1 | 2 | 3 |
|---|---|---|---|
| Initial volume of solution (ml) | 200 | 200 | 180 |
| Metal powder used | crushed cupro-ferro-nickel, 50 μ | iron powder, 10 μ | iron powder 50 μ |
| Content of initial solution: | | | |
| $Cu^{++}$ g/l | 26.5 | 20.3 | 20.3 |
| (Total iron)$Fe^t$ g/l | 104 | 84 | 84 |
| $Fe^{++}$ g/l | 103 | 0.006 | 0.006 |
| Quantity of precipitating powder introduced (in g) | | | |
| for precipitating $Cu^{++}$ | 12.7 | 7.1 | 6.4 |
| for reducing $Fe^{3+}$ | 0 | 8.4 | 7.6 |
| Volume of filtrate collected (ml) | 210 | 210 | 230 |
| Residual content | | | |
| $Cu^{++}$ g/l | 20.8 | 0.009 | 0.002 |
| (Total Iron) $Fe^t$ g/l | 100 | 146 | 120.5 |
| $Fe^{++}$ g/l | 98 | 146 | 120.6 |
| Weight of precipitate obtained (g) | 13 | 11 | 9.2 |
| Proportion of copper precipitated | 19 % | 99.9 % | 99.99% |

As can be seen, the proportions of copper precipitated are extremely close to 100% when iron powder is used, and much less when crushed cupro-nickel powder obtained directly from nodules is used. Nonetheless, the latter material may be preferred for precipitation even if it results in multi-step operations, since it costs much less than iron powder.

D. ELECTRO-REFINING OF THE COPPER

This step is conventional in copper metallurgy and is described in the work "Electrolytic Copper Refining," chapter 8, by C. W. Eichrodt and J. H. Schloen.

E. PURIFYING THE AQUEOUS SOLUTION; and
F. RE-EXTRACTION OF THE COBALT AND IRON The solution obtained after the precipitation (C) consists mainly of chlorides of nickel, cobalt and iron. Pure metals can be obtained from this solution as described in our British patent specification No. 1,385,263. After the solution of chlorides has been oxidized by chlorine, the iron can be extracted by an organic solvent such as tributyl phosphate, after which cobalt can be extracted by an organic solvent such as triisooctylamine.

G. ELECTROLYSING TO YIELD NICKEL

A purified nickel chloride solution is left after the extraction or iron and cobalt and subsequently usually electrolysed to produce very pure metallic nickel.

Of course, the chlorine liberated during electrolysis is recycled towards earlier steps in the method, in particular towards the step (C) of reacting gaseous chlorine with the metal concentrate, in practice comprising lixiviation by chlorinated water.

The iron and cobalt in the respective organic solvents from step (E) are re-extracted therefrom in step (F) by contacting each solvent with an aqueous solution of hydrochloric acid. The resulting aqueous solutions (iron chloride and cobalt chloride respectively) are then electrolysed so as to recover the corresponding metals in highly pure form. The chlorine liberated during the last-mentioned electrolysis operations is also recycled to earlier steps in the method.

As can be seen, all the process steps described hereinbefore, except for the precipitation C, can be performed in existing installations, or at least in installations capable of processing other products such as ores, ferro-nickels and other nickeliferous products. Consequently, the method according to the invention can be used for processing polymetallic nodules from the sea irrespective of their place of origin without the need for substantial investment, except for the cost of a precipitation installation, which can be a very simple structure.

What we claim is:

1. A method of extracting constituent metal values from polymetallic nodules from the sea, comprising the following steps in succession:
    a. melting the nodules under reducing conditions at a temperature up to 1700° C in the presence of a carbonaceous reducing agent in an amount of about from 3 to 10% of the weight of the melt to obtain a concentrate containing at least nickel, copper, cobalt, and a part of the iron in the nodules;
    b. reacting gaseous chlorine in an amount of from 0.9 to 1.1 times that stoichiometrically necessary with the metal concentrate in an aqueous medium at a temperature of about from 70° to 100° C, thereby to obtain an aqueous solution containing chlorides of nickel, cobalt, copper and iron, and removing any solid matter from the aqueous solution;
    c. precipitating the copper contained in the aqueous solution using a more electropositive metal powder, and melting and casting the precipitate into anodes;
    d. electro-refining the copper precipitate anodes;
    e. removing the iron contained in the solution issuing from step (c) by liquid-liquid exchange by means of a first organic phase containing tributyl phosphate and regenerating said first organic phase by means of a first aqueous phase thus yielding a pure aqueous solution of ferric chloride; and
    f. removing the cobalt contained in the solution issuing from step (c) by liquid-liquid exchange by means of a second organic phase containing triisooctylamine and regenerating said second organic phase by means of a second aqueous phase thus yielding a pure aqueous solution of cobalt chloride.

2. A method as claimed in claim 1, further comprising
    electrolyzing the aqueous solution resulting from the purification and removal in steps (e) and (f) to yield nickel.

3. A method as claimed in claim 1, further comprising electrolyzing the aqueous re-extraction phases from the reextractions in steps (e) and (f) so as to yield iron and cobalt.

4. A method as claimed in claim 1, wherein the metal powder used during the precipitation step (c) is iron powder.

5. A method as claimed in claim 1, wherein the metal powder used during the precipitation is the crushed product of the melting under reducing conditions (a).

6. A method as claimed in claim 1, wherein the chlorine produced during the electrolysis in steps (d), (g) and elsewhere is recycled to the reaction step (b).

7. A method as claimed in claim 1, wherein the reaction step (b) is continuously performed in a reaction column continuously supplied at its lower end with water and gaseous chlorine and at its upper end with the metal concentrate, aqueous solution being continuously withdrawn from an upper part of the column.

8. A method as claimed in claim 9, wherein part of the withdrawn aqueous solution is recycled to the lower end of the reaction column.

9. The method as claimed in claim 1 wherein the solution issuing from step (c) is oxidized prior to steps (e) and (f).

10. The method as claimed in claim 1 wherein the first and second aqueous phases of steps (e) and (f) each consist of an aqueous solution of hydrochloric acid.

11. A method of extracting constituent metal values from polymetallic nodules from the sea, comprising the following steps in succession:
    a. melting the nodules under reducing conditions at a temperature up to 1700° C in the presence of a carbonaceous reducing agent in an amount of about from 3 to 10% of the weight of the melt;
    b. reacting gaseous chlorine with the metal concentrate at a temperature of from 70° to 100° C in a reaction column continuously supplied at its lower end with water and gaseous chlorine and at its upper end with the metal concentrate, aqueous solution being continuously withdrawn from an upper part of the column, part of the withdrawn aqueous solution being recycled to the lower end of the reaction column, the amount of chlorine used being between 0.9 to 1.1 times that stoichiometrically necessary;

c. precipitating the copper contained in the aqueous solution using a more electropositive metal powder, and melting and casting the precipitate into anodes;

d. electro-refining the copper precipitate anodes;

e. removing the iron contained in the solution issuing from step (c) by liquid-liquid exchange by means of a first organic phase containing tributyl phosphate and regenerating said first organic phase by means of a first aqueous phase thus yielding a pure aqueous solution of ferric chloride;

f. removing the cobalt contained in the solution issuing from step (c) by liquid-liquid exchange by means of a second organic phase containing tri-isooctylamine and regenerating said second organic phase by means of a second aqueous phase thus yielding a pure aqueous solution of cobalt chloride; and g. electrolyzing the aqueous solution resulting from the purification and removal in steps (e) and (f) to yield nickel and recycling the produced chlorine to reaction step (b).

* * * * *

UNITED STATES PATENT AND TRADEMARK OFFICE
CERTIFICATE OF CORRECTION

PATENT NO. : 4,016,055
DATED : April 5, 1977
INVENTOR(S) : Louis GANDON et al

It is certified that error appears in the above-identified patent and that said Letters Patent are hereby corrected as shown below:

In the Specification, column 4, line 64, "British" should read --U.S.--.

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*